US009327368B2

(12) United States Patent
Hagan (10) Patent No.: US 9,327,368 B2
(45) Date of Patent: May 3, 2016

(54) FULL RING INNER AIR-SEAL WITH LOCKING NUT

(71) Applicant: United Technologies Corporation, Hartford, CT (US)

(72) Inventor: Benjamin F. Hagan, Manchester, CT (US)

(73) Assignee: United Technologies Corporation, Hartford, CT (US)

(*) Notice: Subject to any disclaimer, the term of this patent is extended or adjusted under 35 U.S.C. 154(b) by 822 days.

(21) Appl. No.: 13/628,298

(22) Filed: Sep. 27, 2012

(65) Prior Publication Data

US 2014/0140827 A1 May 22, 2014

(51) Int. Cl.
| | |
|---|---|
| *F01D 11/00* | (2006.01) |
| *F01D 11/02* | (2006.01) |
| *B23P 15/04* | (2006.01) |
| *F02C 7/28* | (2006.01) |
| *F01D 11/04* | (2006.01) |
| *F01D 11/10* | (2006.01) |
| *F01D 9/06* | (2006.01) |

(52) U.S. Cl.
CPC ............. *B23P 15/04* (2013.01); *F01D 11/04* (2013.01); *F01D 11/10* (2013.01); *F02C 7/28* (2013.01); *F01D 9/065* (2013.01); *F01D 11/001* (2013.01); *F01D 11/005* (2013.01); *F05D 2240/11* (2013.01); *F05D 2250/191* (2013.01); *F05D 2260/30* (2013.01); *Y10T 29/49336* (2015.01)

(58) Field of Classification Search
CPC ..... F01D 11/001; F01D 11/005; F01D 11/02; F01D 11/12; F01D 11/122; F01D 11/127; F01D 9/06; F01D 9/065; F02C 7/28; F05D 2260/30; Y10T 29/49323; Y10T 29/49336
USPC ............... 415/115, 116, 173.7, 174.4, 174.5, 415/174.2
See application file for complete search history.

(56) References Cited

U.S. PATENT DOCUMENTS

| | | | |
|---|---|---|---|
| 4,375,891 A | 3/1983 | Pask | |
| 4,721,433 A | 1/1988 | Piendel et al. | |
| 4,820,116 A | 4/1989 | Hovan et al. | |
| 5,343,694 A * | 9/1994 | Toborg et al. | ................... 60/796 |
| 6,808,364 B2 | 10/2004 | O'Reilly et al. | |
| 7,708,520 B2 | 5/2010 | Paolillo et al. | |
| 8,167,547 B2 | 5/2012 | Wu et al. | |

(Continued)

FOREIGN PATENT DOCUMENTS

| | | |
|---|---|---|
| EP | 1614862 B1 | 1/2006 |
| EP | 2392780 A2 | 12/2011 |

OTHER PUBLICATIONS

International Search Report and Written Opinion for International Application No. PCT/US2013/061513 completed on Dec. 19, 2013.

(Continued)

*Primary Examiner* — Christopher Verdier
(74) *Attorney, Agent, or Firm* — Carlson, Gaskey & Olds, PC (57) ABSTRACT

A vane assembly has a vane including an inner platform with a mount rail extending radially inwardly toward an engine center axis. An air seal is attached to the inner platform. The air seal has a single-piece ring extending circumferentially about the engine center axis. A ring nut secures the air seal to the inner platform. A biasing member cooperates with the ring nut and air seal to seal fore and aft locations on the vane.

20 Claims, 8 Drawing Sheets

(56) References Cited

U.S. PATENT DOCUMENTS

| | | |
|---|---|---|
| 2004/0062637 A1 | 4/2004 | Dube et al. |
| 2008/0080970 A1 | 4/2008 | Cooke et al. |
| 2009/0208322 A1 | 8/2009 | McCaffrey |
| 2011/0044804 A1 | 2/2011 | DiPaola et al. |
| 2012/0099969 A1 | 4/2012 | Gilman |
| 2012/0177485 A1 | 7/2012 | Virkler et al. |
| 2012/0195737 A1 | 8/2012 | Butler |
| 2014/0050564 A1* | 2/2014 | Hagan et al. ............ 415/116 |

OTHER PUBLICATIONS

International Preliminary Report on Patentability for International Application No. PCT/US2013/061513 mailed Apr. 9, 2015.

* cited by examiner

FULL RING INNER AIR-SEAL WITH LOCKING NUT

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Compressor and turbine sections include stages of rotating airfoils and stationary vanes. Radially inboard and outboard platforms and seals contain gas flow through the airfoils and vanes. Seals between rotating and static parts include edges that ride and abut static honeycomb elements. Moreover, cooling airflow is often directed through the static vanes to inner surfaces to provide an air pressure and/or flow that further contain the flow of hot gases between platforms of the airfoils and vanes. The structures required to define sealing interfaces and cooling air passages can be costly and complicate assembly.

Accordingly, it is desirable to design and develop structures that reduce cost and simplify assembly while containing hot gas flow and defining desired cooling airflow passages.

SUMMARY

A turbine section according to an exemplary embodiment of this disclosure, among other possible things includes a turbine section with at least first and second turbine rotors each carrying turbine blades for rotation about a central axis. The first and second turbine rotors each have at least one rotating seal at a radially inner location. A vane assembly includes a vane extending from a platform. An air seal is attached to the vane assembly. The air seal comprises a ring extending circumferentially about the axis. A ring nut is received on the air seal for axially securing the air seal to the vane assembly. A biasing member reacts against the ring nut to prevent the ring nut from being removed from the air seal once installed.

In another embodiment according to the previous embodiment, the air seal includes a first set of features that cooperate with a second set of features on the vane assembly for circumferentially locating the air seal relative to the vane assembly.

In another embodiment according to any of the previous embodiments, the first set of features comprises a plurality of tabs extending radially outwardly from a center rail of the air seal. The second set of features comprises a plurality of axially extending lugs formed on a mounting rail extending radially inward from the platform.

In another embodiment according to any of the previous embodiments, the air seal comprises a single-piece structure.

In another embodiment according to any of the previous embodiments, a lock ring is engaged to the air seal and the ring nut for securing a relative position between the ring nut and the air seal.

In another embodiment according to any of the previous embodiments, the biasing member comprises at least one seal.

In another embodiment according to any of the previous embodiments, the at least one seal comprises at least a first seal disposed between the ring nut and a vane mounting rail and a second seal disposed between a center rail of the air seal and the ring nut.

In another embodiment according to any of the previous embodiments, the air seal includes a forward wall with openings for exhausting air flow.

In another embodiment according to any of the previous embodiments, a plurality of slots is formed within a forward face of the ring nut. The air seal includes a plurality of tabs circumferentially spaced apart from each other. The ring nut is configured to be movable between an unlock position and a lock position. When in the unlock position, the tabs slide through the slots with the ring nut subsequently being rotated into the lock position where the tabs are prevented from sliding through the slots.

In another embodiment according to any of the previous embodiments, the biasing member provides a biasing force. An axial installation force is greater than the biasing force during rotation of the ring nut away from the unlock position. The biasing force moves the lock nut into the lock position once the ring nut has been rotated to the lock position and the axial installation force is removed.

In another featured embodiment, a vane assembly has a vane including an inner platform having a mount rail extending radially inwardly toward an engine center axis. An air seal is attached to the inner platform. The air seal comprises a single-piece ring extending circumferentially about the engine center axis. A ring nut secures the air seal to the inner platform. A biasing member cooperates with the ring nut and air seal to seal fore and aft locations on the vane.

In another embodiment according to the previous embodiment, the biasing member comprises at least first and second seals.

In another embodiment according to any of the previous embodiments, the mount rail and the ring nut define a first seal cavity for the first seal. The ring nut and center rail of the air seal define a second seal cavity for the second seal.

In another embodiment according to any of the previous embodiments, the air seal includes a radially outwardly extending forward wall with an axially extending lip. An air chamber is formed between the forward wall, an inner surface of the inner platform, the mount rail, and an outer surface of the air seal. The first and second seals generate a biasing force to seal the lip against a vane rim at a forward location and to seal the ring nut to the vane at an aft location.

In another embodiment according to any of the previous embodiments, the forward wall includes a plurality of openings to exhaust cooling air flow from the air chamber.

In another embodiment according to any of the previous embodiments, a lock ring is engaged to the air seal and the ring nut for securing a relative position between the ring nut and the air seal.

In another featured embodiment, a method of assembling a vane assembly includes defining a plurality of vanes circumferentially about an axis that extend from an inner platform. A front rim of the inner platform abuts a forward lip of an air seal. A ring nut is installed on an aft end of the air seal. A biasing force is provided against the ring nut to prevent the ring nut from rotating relative to the air seal. The biasing force is overcome to allow the ring nut to rotate to a lock position with the biasing force subsequently returning the ring nut to a non-rotatable condition.

In another embodiment according to the previous embodiment, a plurality of tabs is engaged on a lock ring with the ring nut to hold a position of the ring nut relative to the air seal.

In another embodiment according to any of the previous embodiments, the biasing force is generated by at least one seal.

In another embodiment according to any of the previous embodiments, the at least one seal includes at least first and second seals, and includes installing the first seal between the inner platform and the ring nut and installing the second seal between the air seal and the ring nut.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
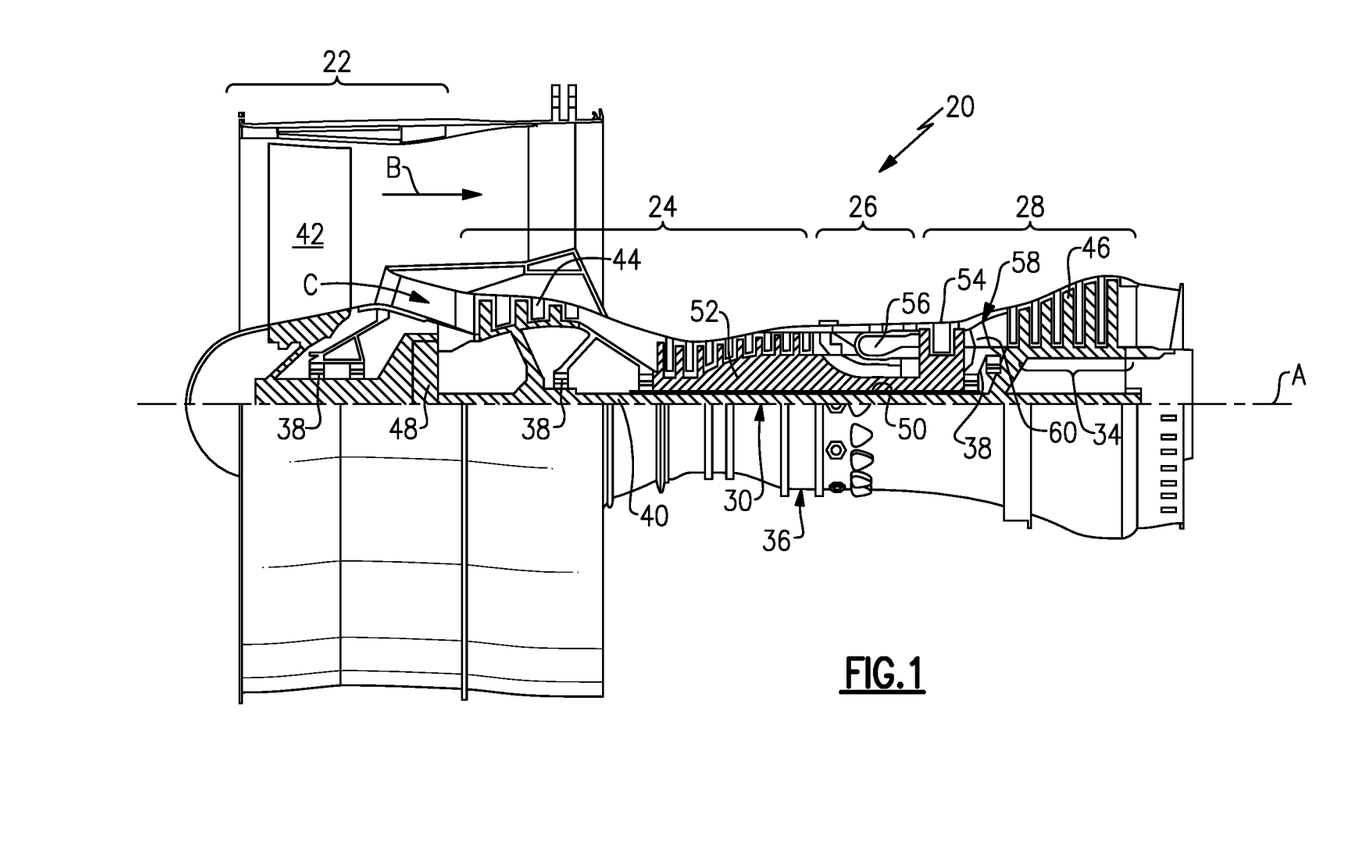
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or second) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or first) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
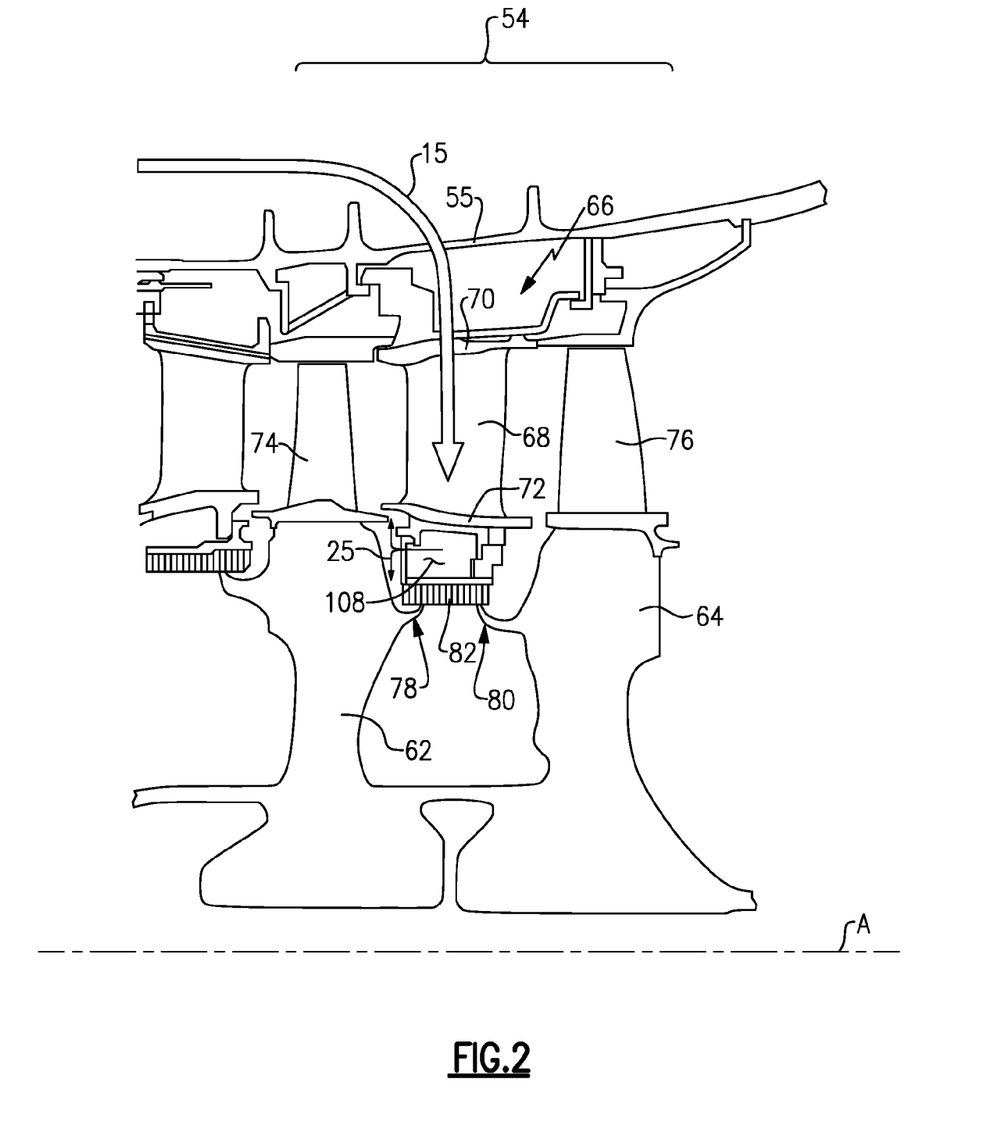
FIG. 2 is an enlarged cross-sectional view of a portion of the gas turbine engine.

Referring to FIG. 2 with continued reference to FIG. 1, the example the high pressure turbine 54 includes first and second rotors 62, 64, and corresponding first and second blades or airfoils 74 and 76 that rotate with the first and second rotors 62, 64. Vane assembly 66 is disposed between rotors 62 and 64. The vane assembly 66 is fixed relative the rotation of the rotors 62 and 64 and includes vane 68 extending between an upper platform 70 and a lower platform 72. Leakage of hot gases through the turbine section 54 is undesirable and therefore features are provided to maintain gas flow between upper and lower platforms 70, 72.

Each of the airfoils 74 and 76 include upper and lower platforms and outer static shrouds that define the gas flow path. Each of the rotors 62, 64 include knife edge seals 78, and 80 that engage a honeycomb structure 82 that is fixed to the static vane assembly 66. The knife edges 78 cooperate with the honeycomb structure 82 to seal and contain gas flow within the defined gas path through the high pressure turbine 54.

Cooling air indicated by arrows 25 is injected into a space between the fixed vane assembly 66 and the rotor 62. The cooling air in this space provides an increased pressure that aids in maintaining gas within the desired flowpath and preventing gas from flowing between the vanes and rotating airfoils 74, 76.

Cooling airflow is shown by the arrow 15 and flows from an outer portion of the turbine case 55 down through openings (not shown) through the vane 68 into a chamber 108 defined below the lower platform 72 of the vane assembly 66. The chamber 108 includes a plurality of openings 102 (FIG. 3) to allow cooling air 25 to flow forward into the gap between the rotor 62 and the fixed stator assembly 66.

Figure 3:
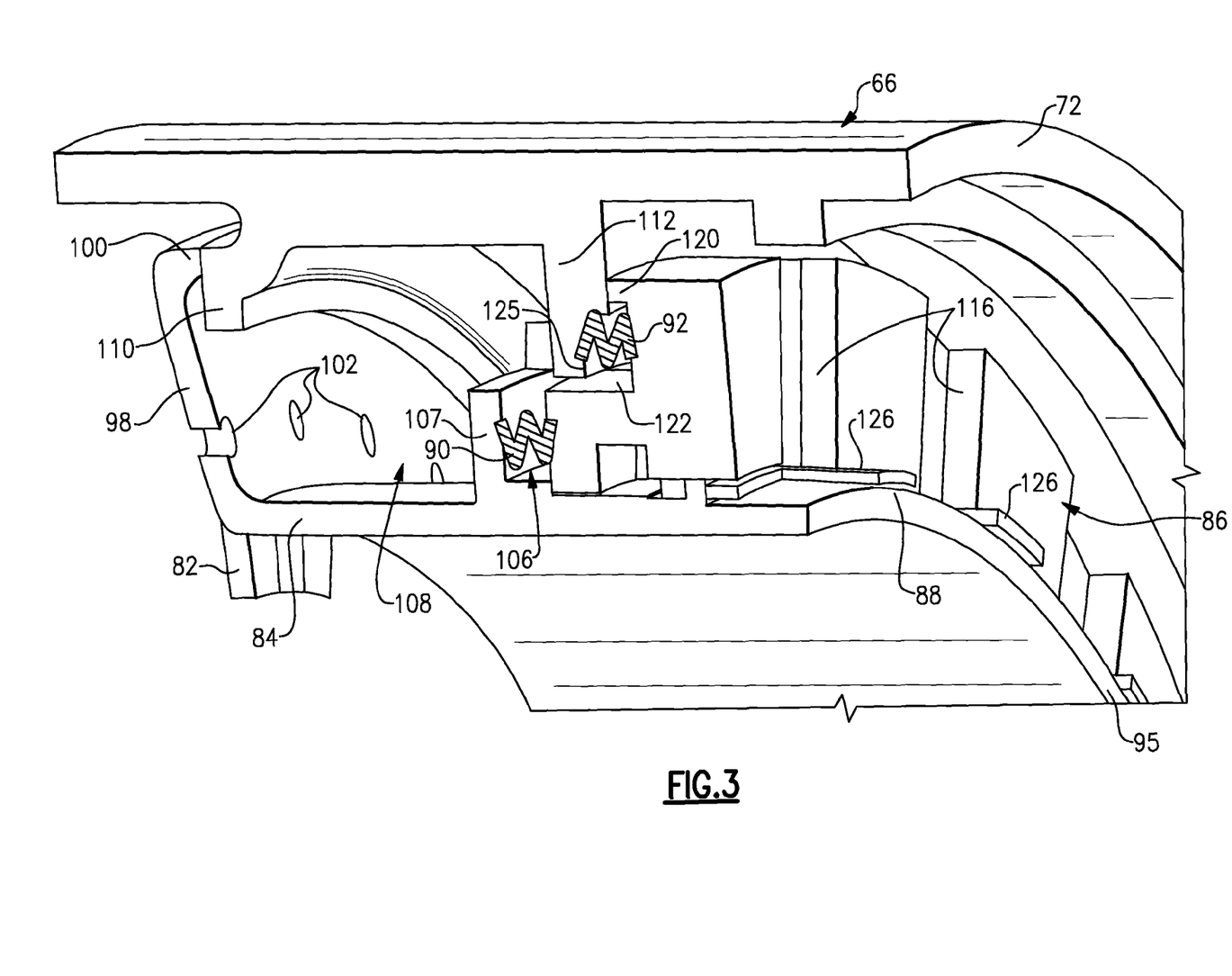
FIG. 3 is a sectional view of an example vane and air seal assembly.

Referring to FIG. 3 with continued reference to FIG. 2, the example vane assembly 66 includes an integral one piece ring air seal 84 that receives cooling air that flows through the vanes 68 into the chamber 108. The air seal 84 is one continuous uninterrupted structure from a wall 98 to the aft most end 95. The air seal 84 is attached to and mounted to the lower platform 72. The air seal 84 extends about the entire circumference of the lower platform 72 and about the axis A.

The example air seal 84 includes the forward wall 98 that defines a front lip 100 that engages a vane rim 110 that creates a forward seal for defining the cooling air chamber 108. The forward wall 98 includes a plurality of openings 102 that eject cooling air 25 into the forward gap between the rotor 62 and the vane assembly 66.

A ring nut 86 fits over tabs 104 (FIG. 4) in the air seal 84 via slots 105 formed in the ring nut 86, and the air seal 84 is then rotated to lock and hold the lower platform 72 of the vane assembly 66 between the front lip 100 and a shoulder 120 of the ring nut 86. The ring nut 86 includes a cavity 122 that corresponds with a slot or groove 125 (FIG. 5) disposed on the lower platform 72 to define an annular cavity for a first seal 92. In this example, the first seal 92 comprises a W-shaped seal that biases outward against surfaces of the ring nut 86 and the lower platform 72.

The lower platform 72 includes a mounting rail 112 that defines the annular groove 125 that corresponds with the cavity 122 defined in the ring nut 86. The first seal 92 is an annular seal that extends about the circumference of the lower platform 72 to provide the desired sealing effect. A second seal 90 is disposed within a gap 106 that is defined in the air seal 84 between a radially outwardly extending center rail 107 and a forward surface of the ring nut 86. In this example, the second seal 90 also comprises a W-shaped seal that biases against the ring nut 86 and air seal 84 to provide the desired sealing features. The combination of the first seal 92 and the second seal 90 provides for the containment of cooling air flow that flows into the cooling chamber 108 defined between the lower platform 72 and the air seal 84. The first seal 92 and the second seal 90 are fabricated from a seal material including properties compatible with the pressures and temperatures encountered in the high pressure turbine 54.

Referring to FIGS. 4, 5, 6, and 7A-7B with continued reference to FIG. 3, the example ring nut 86 includes a first set of slots 116 formed in an aft end face 130 of the ring nut 86. In one example, each slot in the first set of slots 116 is disposed at an equally spaced interval about the circumference of the ring nut 86 from a neighboring slot; however, other spacing configurations could also be used. The ring nut 86 includes a second set of slots 105 (only one is shown) that are formed within a forward face 132 of the ring nut 86. Fewer slots 105 are desired, as this is a path for leakage.

Figure 4:
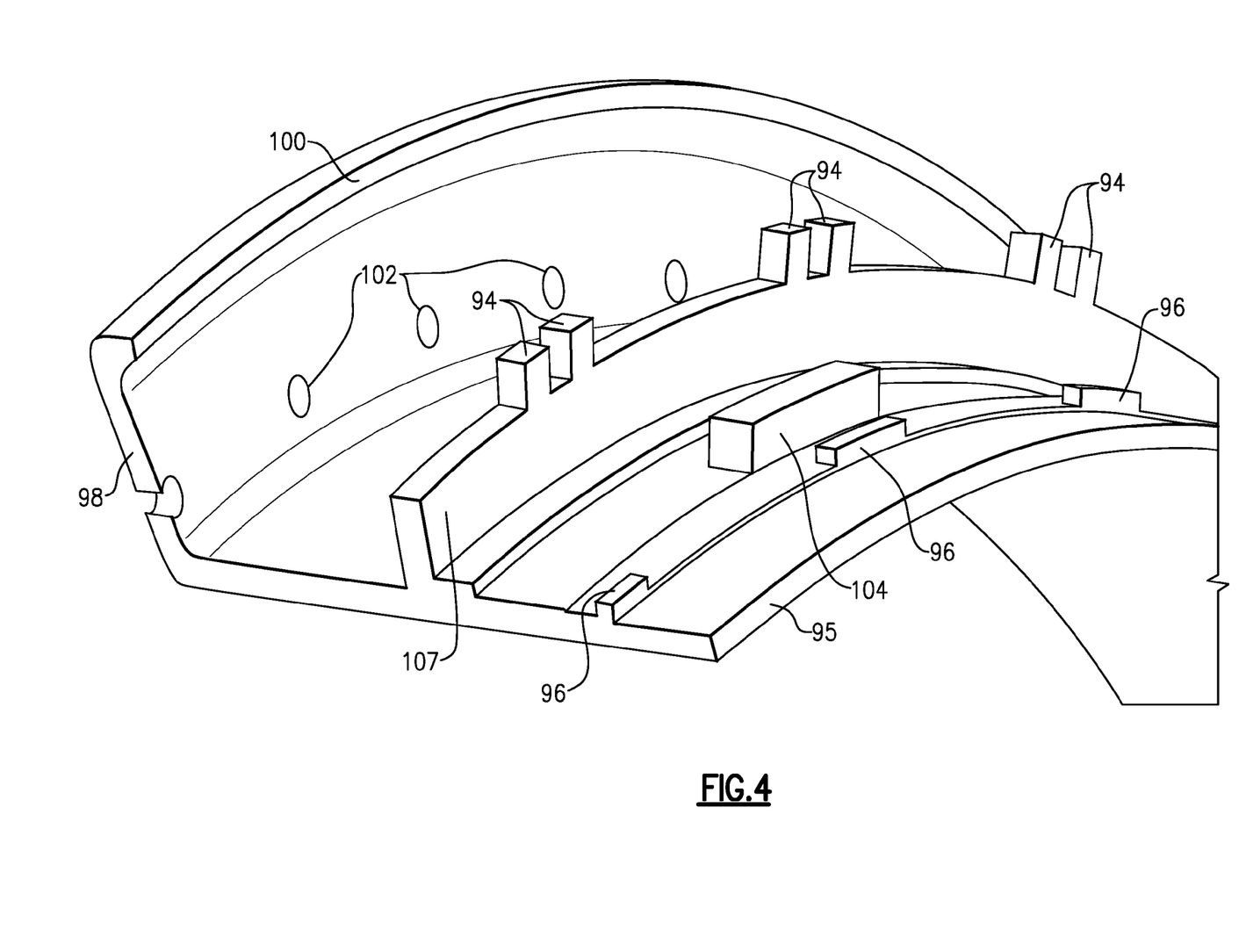
FIG. 4 is a sectional view of an example air seal.

The air seal 84 includes a first set of tabs 96 that are positioned axially between the center rail 107 and the aftmost end 95 of the air seal 84. The air seal 84 includes a second set of tabs 104 that are positioned axially between the center rail 107 and the first set of tabs 96. The air seal 84 also includes a third set of tabs 94 that are formed on the center rail 107.

Figure 8:
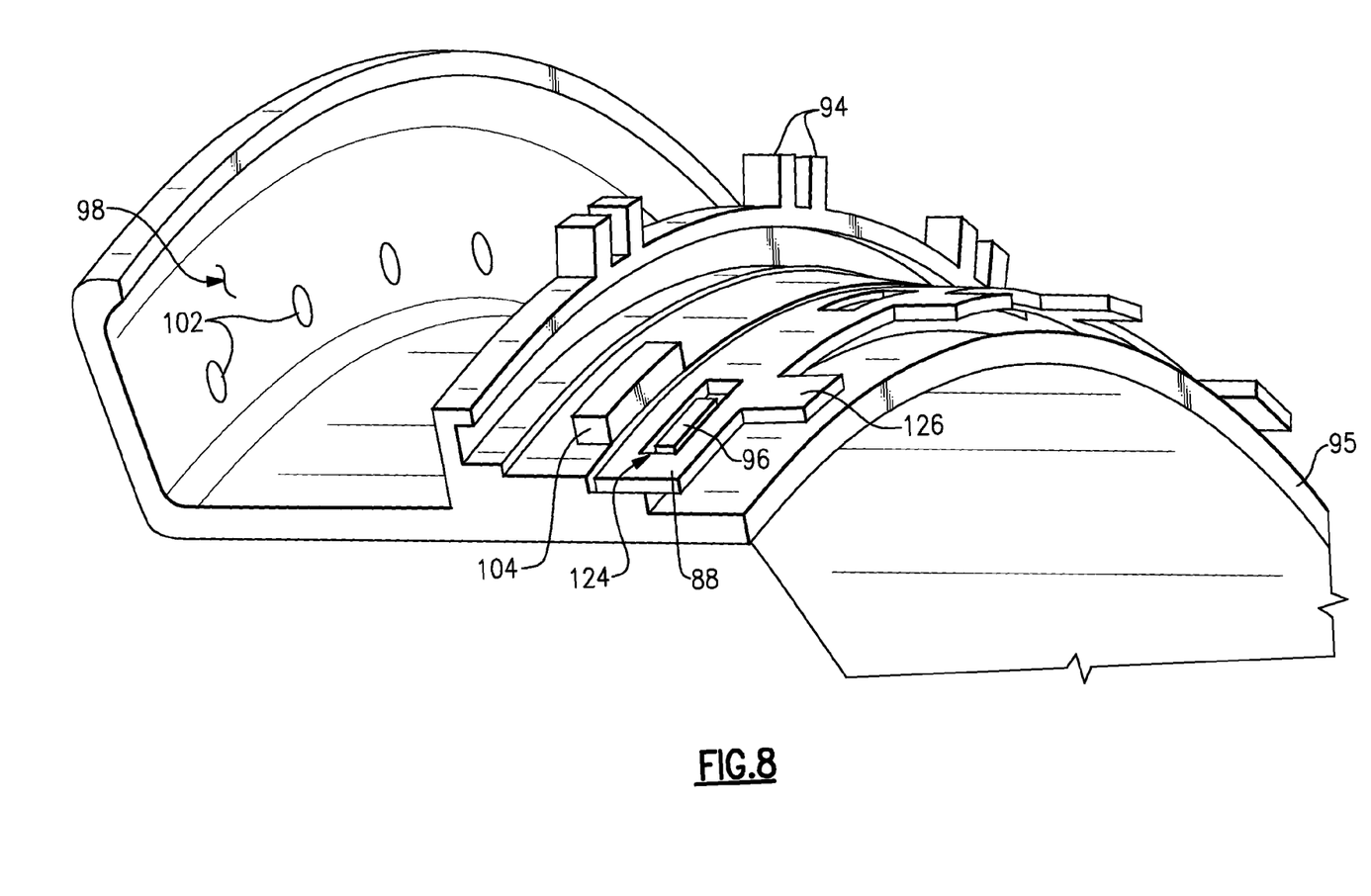
FIG. 8 is a schematic view of the example air seal including the lock ring.

A locking ring segment 88 (FIG. 6) includes openings 124 that receive the first set of tabs 96 of the air seal 84 to fix the locking ring segments 88 relative to the air seal 84 (FIG. 8). In the example shown, the locking ring segment 88 comprises one of three identical segments 88 that cooperate to provide a full locking ring. Each segment comprises approximately 120 degrees of the circumference of the full ring. It should be understood that while three segments are used in one example, the ring could be comprised of fewer or additional locking ring segments 88.

Figure 6:
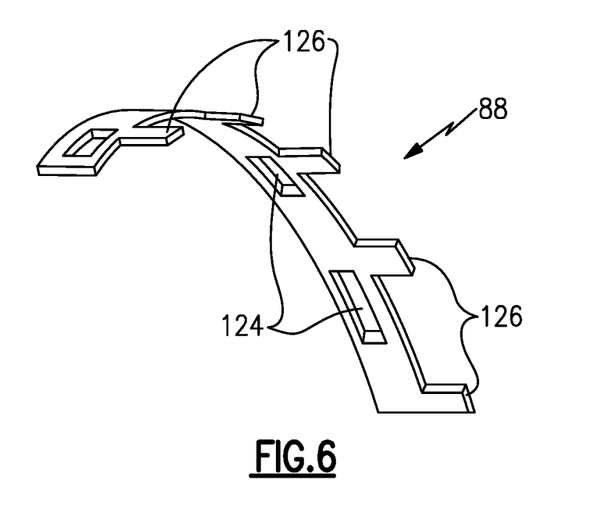
FIG. 6 is a perspective view of an example lock ring segment.

The locking ring segments 88 include tabs 126 that bend upward into the slots 116 on the aft face 130 of the nut 86 once the locking nut 86 is rotated to a desired location. The tabs 126 disposed within the slots 116 of the nut 86 prevent rotation of the nut 86 away from the desired locked position. Any number of tabs 126 greater than one can be bent into the slots 116, i.e. there must be at least two tabs 126 bent into two slots 116.

Figure 5:
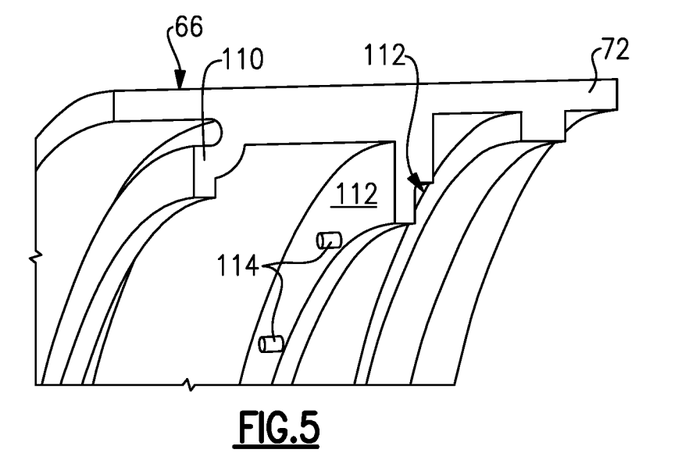
FIG. 5 is a cross-sectional view of an example lower platform.

The example lower platform 72 includes the forward vane rim 110 and the mounting rail 112. The mounting rail 112 is disposed approximately midway between fore and aft edges of the lower platform 72. The example mounting rail 112 abuts the shoulder 120 of the ring nut 86 to bias the vane rim 110 into engagement with the front lip 100 of the air seal 84. The interface between the front lip 100 and the vane rim 110 provides the sealing required to contain cooling airflow in the chamber 108.

As discussed above, the air seal includes a third set of paired tabs 94 that are disposed about the circumference of the air seal 84, and which extend outwardly from the center rail 107. The example paired tabs 94 are evenly spaced, however, the paired tabs 94 cold be spaced in any manner about the air seal 84. A space between the paired tabs 94 receives lugs 114 on the mounting rail 112 of the lower platform 72 for centering purposes. The lugs 114 are circumferentially spaced apart from each other and extend in an axially forward direction from a forward face of the mounting rail 112. The lugs 114 received within the space between tabs 94 prevent rotation and maintain a relative circumferential position between the lower platform 72 and the example air seal 84. As appreciated, although only a few lugs 114 are illustrated, a plurality of lugs 114 are spaced at intervals about the circumference of the mounting rail 112 and are received between tabs 94 within the example air seal 84.

Figure 7A:
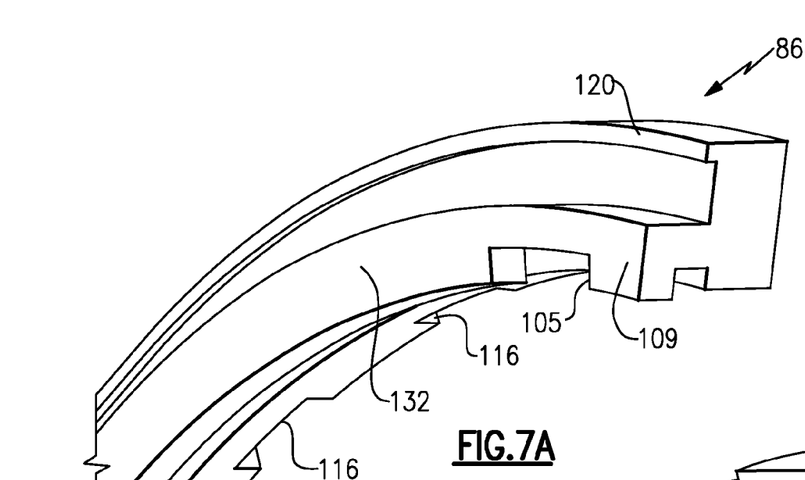
FIG. 7A is a front perspective view of a portion of a ring nut.
Figure 7B:
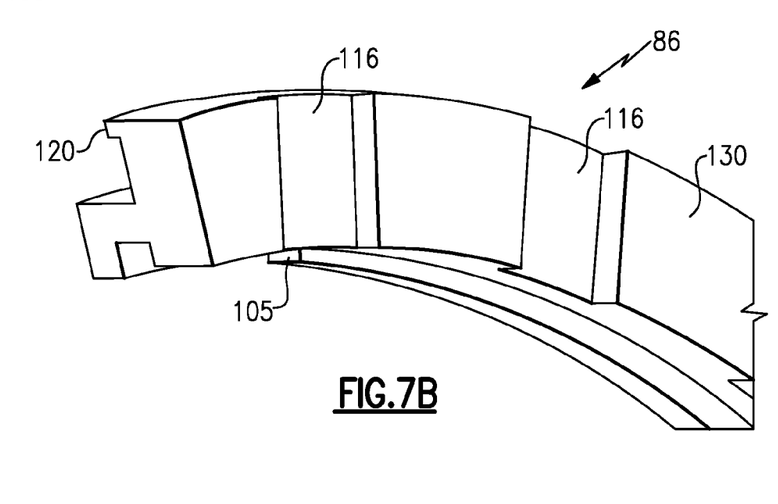
FIG. 7B is a rear perspective view of the ring nut of FIG. 7A.

The air seal 84 and nut 86 provide a bayonet fastening configuration where the nut 86 is installed against a resilient biasing force and then is rotated and released such that the biasing force axially moves and locks the nut 86 in place. The ring nut 86 is received on the air seal 84 for axially securing the air seal 84 to the vane assembly; however, the air seal 84 and ring nut 86 are free to move radially independent of the vane assembly. As shown in FIG. 7A, the nut 86 includes a set of slots 105 that are formed within a forward wall 109 of the nut 86. During assembly, the second set of tabs 104 on the air seal 84 slide axially through these slots 105, and then the nut 86 is rotated such that the slots 105 and tabs 104 are no longer aligned with each other. The seals 90, 92 then push the nut 86 in an aft direction to lock the nut 86 in place. As appreciated, although only one slot 105 and tab 104 are illustrated, a plurality of slots 105 and tabs 104 are spaced at intervals about the circumference of the respective nut 86 and air seal 84.

Figure 9:
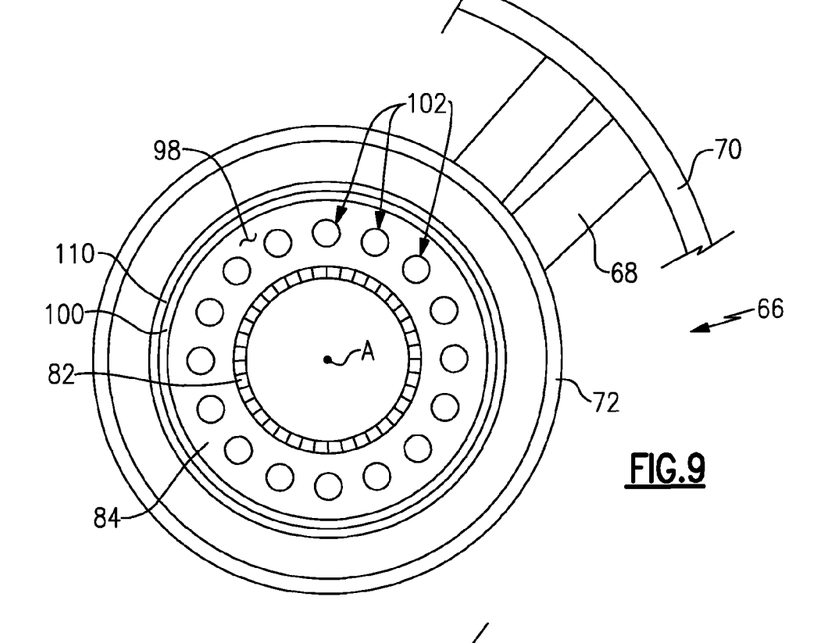
FIG. 9 is a front view of the example vane assembly.
Figure 10:
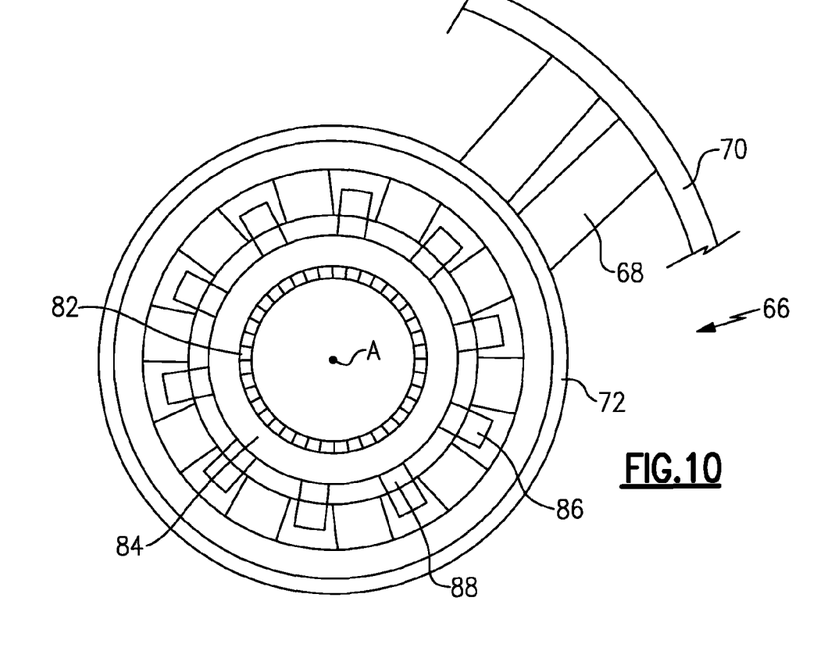
FIG. 10 is a rear view of the example vane assembly.

Referring to FIGS. 9 and 10 with continued reference to FIG. 3, the example vane assembly 66 includes a plurality of vanes 68 between the upper platform 70 and a lower platform 72. The lower platform 72 is mounted to the air seal 84 such that cooling airflow can be channeled through the various vanes 68 to the chamber 108 (FIG. 3) defined between the lower platform 72 and the air seal 84. The example air seal 84 is a continuous ring about the axis A and eliminates complications caused by multiple pieces or segmented structures.

Accordingly, the example air seal 84 provides a continual seal engagement with the lower platform 72 to provide the desired cooling passages and support the honeycomb structure 82 that engages seal knife edges 78, 80 on the rotors 62, 64. The single piece annular ring nut 86 is locked in place by a single, or multiple, segmented lock ring(s) 88 to provide the desired sealing function and connection to the lower platform 72.

The full ring inner air seal 84 cooperates with the ring nut 86 to axially clamp around a vane inner diameter using a bayonet feature, which allows the air seal 84 to float in the radial direction. The w-seals 90, 92 provide sealing in an aft region as well as providing an axial load to seal the front of the full ring air seal 84 against the vanes 68. The use of a single-piece air seal 84, as opposed to a traditional segmented seal, provides a better thermal growth match to rotating cover plate knife edges, which reduces a running gap between static and rotating hardware. Thus, reduced knife edge clearance between the vane and rotor system is provided to improve rim cavity sealing (resulting in reduced turbine cooling flow requirements), and reduced leakage in the vane inner air seal area is provided due to the removal of segmented gaps and their associated leaks. Further, the bayonet configuration reduces wear on the w-seals 90, 92 and improves their durability.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine section comprising:
    at least first and second turbine rotors each carrying turbine blades for rotation about a central axis, said first and second turbine rotors each having at least one rotating seal at a radially inner location;
    a vane assembly including a vane extending from a platform;
    an air seal attached to the vane assembly, the air seal comprising a ring extending circumferentially about the axis;
    a ring nut received on the air seal for axially securing the air seal to the vane assembly; and
    a biasing member reacting against the ring nut to prevent the ring nut from being removed from the air seal once the ring nut is installed.

2. The turbine section as recited in claim 1, wherein the air seal includes a first set of features that cooperate with a second set of features on the vane assembly for circumferentially locating the air seal relative to the vane assembly.

3. The turbine section as recited in claim 2, wherein the first set of features comprises a plurality of tabs extending radially outwardly from a center rail of the air seal, and wherein the second set of features comprises a plurality of axially extending lugs formed on a mounting rail extending radially inward from the platform.

4. The turbine section as recited in claim 1, wherein the air seal comprises a single-piece structure.

5. The turbine section as recited in claim 1, including a lock ring engaged to the air seal and the ring nut for securing a relative position between the ring nut and the air seal.

6. The turbine section as recited in claim 1, wherein the biasing member comprises at least one seal.

7. The turbine section as recited in claim 6, wherein the at least one seal comprises at least a first seal disposed between the ring nut and a vane mounting rail and a second seal disposed between a center rail of the air seal and the ring nut.

8. The turbine section as recited in claim 1, wherein the air seal includes a forward wall with openings for exhausting air flow.

9. The turbine section as recited in claim 1, including a plurality of slots formed within a forward face of the ring nut and wherein the air seal includes a plurality of tabs circumferentially spaced apart from each other, and wherein ring nut is configured to be movable between an unlock position and a lock position, wherein when in the unlock position the tabs slide through the slots with the ring nut subsequently being rotated into the lock position where the tabs are prevented from sliding through the slots.

10. The turbine section as recited in claim 9, wherein the biasing member provides a biasing force and wherein an axial installation force is greater than the biasing force during rotation of the ring nut away from the unlock position and wherein the biasing force moves the lock nut into the lock position once the ring nut has been rotated to the lock position and the axial installation force is removed.

11. A vane assembly comprising:
   a vane including an inner platform having a mount rail extending radially inwardly toward an engine center axis;
   an air seal attached to the inner platform, the air seal comprising a single-piece ring extending circumferentially about the engine center axis;
   a ring nut securing the air seal to the inner platform; and
   a biasing member that cooperates with the ring nut and air seal to seal fore and aft locations on the vane.

12. The vane assembly as recited in claim 11, wherein the biasing member comprises at least first and second seals.

13. The vane assembly as recited in claim 12, wherein the mount rail and the ring nut define a first seal cavity for the first seal and wherein the ring nut and center rail of the air seal define a second seal cavity for the second seal.

14. The vane assembly as recited in claim 13, wherein the air seal includes a radially outwardly extending forward wall with an axially extending lip, and wherein an air chamber is formed between the forward wall, an inner surface of the inner platform, the mount rail, and an outer surface of the air seal, and wherein the first and second seals generate a biasing force to seal the lip against a vane rim at a forward location and to seal the ring nut to the vane at an aft location.

15. The vane assembly as recited in claim 14, wherein the forward wall includes a plurality of openings to exhaust cooling air flow from the air chamber.

16. The vane assembly as recited in claim 11, including a lock ring engaged to the air seal and the ring nut for securing a relative position between the ring nut and the air seal.

17. A method of assembling a vane assembly comprising:
   defining a plurality of vanes circumferentially about an axis that extend from an inner platform;
   abutting a front rim of the inner platform against a forward lip of an air seal;
   installing a ring nut on an aft end of the air seal;
   providing a biasing force against the ring nut to prevent the ring nut from rotating relative to the air seal; and
   overcoming the biasing force to allow the ring nut to rotate to a lock position with the biasing force subsequently returning the ring nut to a non-rotatable condition.

18. The method as recited in claim 17, including the step of engaging a plurality of tabs on a lock ring with the ring nut to hold a position of the ring nut relative to the air seal.

19. The method as recited in claim 17, wherein the biasing force is generated by at least one seal.

20. The method as recited in claim 19, wherein the at least one seal includes at least first and second seals, and including installing the first seal between the inner platform and the ring nut and installing the second seal between the air seal and the ring nut.

* * * * *